(12) United States Patent
Hlynianski

(10) Patent No.: US 6,455,691 B1
(45) Date of Patent: *Sep. 24, 2002

(54) PREPARATION OF CHEMICALLY REACTIVE POLYSACCHARIDES

(75) Inventor: Daniel Richard Hlynianski, Chester (GB)

(73) Assignee: University of Wales, Bangor, Gwynedd (GB)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/284,678

(22) PCT Filed: Oct. 16, 1997

(86) PCT No.: PCT/GB97/02745
§ 371 (c)(1),
(2), (4) Date: Jun. 14, 1999

(87) PCT Pub. No.: WO98/17692
PCT Pub. Date: Apr. 30, 1998

(30) Foreign Application Priority Data

Oct. 19, 1996 (GB) .............................................. 9621817
Mar. 19, 1997 (GB) .............................................. 9705635

(51) Int. Cl.[7] .............................................. C08B 37/00
(52) U.S. Cl. ........................ 536/55.3; 536/55.1; 536/30; 536/45; 536/52; 536/48; 536/102; 536/123; 536/124; 536/58
(58) Field of Search ............................ 536/58, 55.1, 30, 536/45, 52, 102, 124, 48, 55.3, 123

(56) References Cited

U.S. PATENT DOCUMENTS 3,732,205 A * 5/1973 Teng et al.
4,278,790 A * 7/1981 McCormick
4,352,770 A * 10/1982 Turbak et al.

FOREIGN PATENT DOCUMENTS

| JP | 59 038203 A | | 3/1984 |
| JP | 59 124933 A | | 7/1984 |
| WO | DE 3227267 | * | 2/1983 |

OTHER PUBLICATIONS

Patent Abstracts of Japan, vol. 8, No. 126 (C–228), Jun. 13, 1984.
Patent Abstracts of Japan, vol. 8, No. 245 (C–251), Nov. 10, 1984.
Dawsey, T.R., et al.: The Lithium Chloride/Dimethlacetamide Solvent for Cellulose: A Literature Review, Journal of Macromolecular Science–Reviews in Macromolecular Chemistry, vol. C30, No. 3/04, Jan. 1, 1990, pp. 405–440.

* cited by examiner

*Primary Examiner*—Samuel Barts
*Assistant Examiner*—Devesh Khare
(74) *Attorney, Agent, or Firm*—Clifford W. Browning; Woodard, Emhardt, Naughton, Moriarity & McNett

(57) ABSTRACT

This invention describes improvements in or relating to the production of polysaccharide derivatives; more particularly it relates to a method of converting insoluble polysaccharides to a form in which they form part of an anhydrous system in which they may be used as chemical intermediates in the production of derivatives.

13 Claims, No Drawings

PREPARATION OF CHEMICALLY REACTIVE POLYSACCHARIDES

The present invention relates to the preparation of chemically reactive polysaccharides and relates more particularly, but not exclusively, to the preparation of chemically reactive forms of starch and cellulose.

Starch is one of the most widely diffused organic substances occurring in nature. It is found in larger quantities in some families of plants than others. For example, it is always found in (great abundance in the seeds of cereals. When extracted and separated from the plant material in which it occurs, starch is in the form of granules. These starch granules contain components which are of interest as chemical intermediates, particularly amylose which has a highly linear structure and the branched chain amylopectin. These are polysaccharides which, when reacted with long chain fatty acid chlorides, form waxes which may be of use in food related applications. However, in order to be able to use the polysaccharide components (e.g. amylose or amylopectin) of starch as chemical intermediates it is generally firstly necessary to convert the starch granules to a form in which the reaction will take place.

As opposed to starch which is comprised of both branched and linear components, cellulose is a linear molecule. Cellulose is the chief constituent of plants and is the material which is present in cell walls and other structural tissues. Cotton is almost pure cellulose and the man made fibre rayon is made from cellulose. Cellulose generally requires conversion into a more reactive form before it may be used for forming chemical derivatives.

U.S. Pat. No. 4,278,790 (McCormick) discloses a method for making homogenous solutions of cellulose in lithium chloride and N,N-dimethylacetamide (DMAc) and the use of such solutions in forming derivatives. The only Example of the dissolution requires a temperature of about 150° C.

In a paper entitled "Homogenous solution reactions of cellulose, chitin and other polysaccharides" (ACS symposium series (1980) vol. 121 pp 371–380), McCormick et al disclose the formation of solutions of cellulose chitin, amylose, amylopectin and dextran by adding a lithium salt (LiCl, LiBr, or $LiNO_3$) to N,N-dimethylacetamide followed by addition of the polysaccharide. The dissolution method appears to be that of U.S. Pat. No. 4,278,790 as a further paper entitled "Solution studies of Cellulose in Lithium Chloride and N,N-dimethylacetamide" (Macromolecules 1985, 18, 2394–2401) describes both the technique of U.S. Pat. No. 4,278, 790 and a new technique which enables a cellulose solution to be produced at room temperature rather than heating to 150° C. This involves pre-treating the cellulose before it is added to the LiCl/DMAc solution. The pre-treatment involves the steps of swelling cellulose overnight in deionised water and then removing excess water followed by four solvent exchanges with dried methanol and a further five exchanges with DMAc followed by drying. The swollen cellulose can then be dissolved at room temperature in LiCl/DMAc solution and used to form chemical derivatives. McCormick et al report that they have found other lithium salts including bromide, iodide, nitrate and sulphate to be ineffective.

In a later paper (Macromolecules 1990, 23, 3606–3610), McCormick et al disclose a process in which cellulose powder is slurried overnight in water and then vacuum filtered. Subsequently the cellulose is treated by the steps of adding methanol, stirring for one hour and filtering. The steps of this procedure are repeated three times followed by five repetitions of a similar procedure with DMAc. The cellulose was then dissolved in LiCl/DMAc at 80° C. followed by stirring while allowing to cool to room temperature. Complete dissolution was achieved in about 20 minutes.

U.S. Pat. No. 4,352,770 discloses processes for forming a shaped cellulose product from LiCl solutions. With the exception of Example 10 of that specification, all other Examples involve a separate pre-treatment to activate the cellulose prior to dissolution. Example 10 of that specification utilises a so-called recovery liquid containing 20 g LiCl, 200 g DMAc and 500 g water. The recovery liquid was fractionally distilled to remove 450, g water and 10 g of pulp were added. The mixture was then further distilled to yield a suspension which contained less than 1% water and in which the cellulose fibres were still whole. After allowing the mixture to stand and cool for six hours, a clear solution bias obtained. Such a solution could be used to form a shaped product. U.S. Pat. No. 4,352,770 also discloses that cellulose which has not been activated will only dissolve in a solution of lithium chloride in DMAc at 150° C. or higher, but that at such temperatures the solution becomes discoloured and significant degradation occurs.

According to the present invention there is provided a method of forming a chemically reactive polysaccharide in an anhydrous medium comprising the steps of:
(1) forming a swollen form of the polysaccharide by heating the polysaccharide in the presence of water;
(2) forming a solvent/polysaccharide/water mixture by adding a solvent to the swollen polysaccharide in water, the solvent being one which has a moiety with the structure

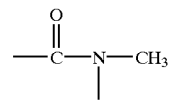

(3) forming an anhydrous solvent/polysaccharide mixture by heating the solvent/polysaccharide/water mixture to remove water while adding further amounts of solvent to maintain a volume of liquid such that the polysaccharide does not settle out and to ensure that all the water is removed; and
(4) dissolving at least 1% by weight of a lithium halide selected from the group consisting of lithium chloride and lithium bromide and mixtures thereof in the anhydrous solvent/polysaccharide mixture.

The process of the invention allows polysaccharides to be converted to form part of a true anhydrous system in which they may be used as chemical intermediates can be simplified and carried out in a single vessel without use of high temperatures which cause degradation. The process of step 4 results in anhydrous mixture. i.e. one including less than about 0.05% free water although it will be appreciated that additionally water may remain bound within the polysaccharide. The process avoids the high temperatures of the process disclosed by McCormick in U.S. Pat. No 4,278,790 and the need for any complicated separate pre-treatment and ensures the absence of water in the material used for the formation of chemical derivatives of the particular polysaccharide.

Polysaccharides which can be converted by the method of the invention to a chemically reactive form include starch, cellulose and chitin but a polysaccharide which contains carboxyl moieties such as pectin is not convertible by the method of this invention.

Sources of starch which may be used in the method of the invention are potato, maize, wheat, rice, sago, and commercially available "High Amylose Starch" (e.g. Hylon VII). Suitable sources of cellulose include cotton linters and straw.

Among the solvents having the moiety

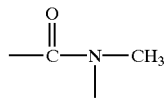

are N,N-dimethylacetamide, N,N-dimethylformamide and N-methylpyrrolidinone. A single solvent is preferred as mixtures of solvents may hinder the removal of water or azeotropic mixtures may be formed which while effective in removing water are impossible to separate in order to recover solvent for recycling. It is difficult to predict how tertiary mixtures containing two of the preferred solvents and water will behave in the presence of another interactive material, the polysaccharide. The preferred solvent is N,N-dimethylacetamide as it separates easily from water and causes little or no degradation of the polysaccharide. Degradation in some cases could be advantageous in producing products of different characteristics.

Heating the polysaccharide in the presence of solvent/water in step 1 results in less effective swelling of the polysaccharide although we do not preclude the possibility of step 1 being effected with a solvent/water mixture.

a concentration of 1 to 15% by weight of the polysaccharide is generally satisfactory for step 1. It may however be that, for certain polysaccharides, amounts lower that 15% should be used. Thus, for example, it will generally be preferred to use at most 10% starch since above this figure difficulty may be encountered in stirring the reaction mixture. It is generally however also preferred that more than 5% of the polysaccharide is employed otherwise the reactor volume may be under-used. Starch usually contains 8 to 15% of water so that the effective weight of starch used is less than the amount added.

In step (3) the water may be removed in any conventional manner such as evaporation under vacuum while stirring. During water removal, additionally solvent is added. The amount of solvent added is conveniently that needed to maintain a volume equivalent to the volume of water used for swelling the polysaccharide (in step (1)) so as to maintain the same concentration of polysaccharide in the solvent as was initially present in the water. During water removal, it is important to prevent material settling out so as to avoid any charring due to heating of the settled material.

In step (4), the amount of lithium halide dissolved in the anhydrous solvent/polysaccharide mixture will generally not exceed 100% and usually will be less than 50%, more preferably less than 20% by weight. It is in fact generally found that the addition of more than 15% by weight of lithium halide, with respect to the polysaccharide, is not necessary. Less than 1% by weight of lithium halide with respect to the polysaccharide is likely to be ineffective. It is preferred that the amount of lithium halide used is in the range 2 to 12% by weight, In the case of starches, it has been found to be that as the amylose content increases the amount of inorganic salt should be increased with 2% being preferred for use with starches mainly consisting of amylopectin. It is believed that the lithium salts assist in maintaining the polysaccharide chains in an open reactive state and prevent them collapsing together to form a material which precipitates from the solvent and that during the chemical reaction the lithium salt is stripped from the polysaccharide as reaction takes place with the hydroxyl groups in the polysaccharide molecules. The preferred salt is lithium chloride though lithium bromide may be used but is less effective.

The anhydrous nature of the mixture resulting from step (4) ensures that satisfactory yields (of substitution products from the reactive form obtained in step (4) using reagents which are water sensitive. e.g. acid chloride, acid anhydrides, isocyanates etc.—see below) are obtained since even the less than 1% water present in the mixture used in U.S. Pat. No. 4,352,770 is unacceptable as water causes several problems, namely:

(1) Degradation of the polysaccharide in the presence of LiCl or LiBr.
(2) During formation of derivatives from the reactive form of the polysaccharide, the agents used to react with the hydroxyl groups on the polysaccharide (e.g.) carboxylic acid chlorides) react preferentially with any water present to form by-products which reduce the overall yield and contaminate the desired product. The by-products have then to be removed resulting in increased costs due to the extra time and materials used in purification and disposal.

The reactive form of the polysaccharide contains hydroxyl groups and as such derivatives may be formed by reaction of these hydroxyl groups. Such derivatives may, for example, be formed with water sensitive reagents such as acid chlorides, acid anhydrides and isocyanates. It is a particular advantage of the invention that the anhydrous nature of the product from step (IV) improve the yield of the derivative obtained using such water sensitive reagents. In a preferred embodiment of the invention, polysaccharide derivatives may are formed by esterification using, for example, fatty acid chlorides, anhydrides or other esterifying agents. Esterified products having long carbon chains (e.g. at least 6. and preferably 10 to 24, carbon atoms) will generally be wax-like materials. The esterification reaction may be conducted in the presence of a catalyst which should be one which ensures good yields and does not interfere with the reaction. The catalyst may be a tertiary amine. Pyridine has been found to be effective in esterifying the reactive polysaccharides of the present invention and also acts as an acid scavenger.

The reactivity of the system produced in the case of starches is such that it is possible to routinely obtain a degree of substitution (D.S.) greater than 2.4 and as high as 2.9. The theoretical maximum is 3 when all hydroxyl groups on each of the individual saccharide units are substituted. McCormick et al in making derivatives of amylose only achieved as D.S. value of 0.44 and 0.22 and with amylopectin, 0.65.

The method chosen for the purifying the modified polysaccharide is dependant upon the uses for the product and the lithium salt used in the dissolution step. Some industrial purposes will permit a small proportion of solvent and lithium salt to be present in the material, which allows the standard toluene/acetone method outlined in example 4 to be used. This is particularly applicable if lithium bromide is used to dissolve the polysaccharide.

For more demanding applications and where lithium chloride is used to dissolve the polysaccharide, residual solvent and lithium halide may be removed by treatment of the crude product with steam followed by dissolution in toluene and precipitation in acetone. More complete removal of lithium salts may be effected by the use of chelating agents which form toluene and acetone soluble lithium chelates.

The following examples illustrate but do not limit the invention.

EXAMPLE 1

60 g (equivalent to 54 g dry) of wheat starch was refluxed in one liter of water for 20 minutes in a reaction vessel so as to ensure that all the starch had been heated to above its gel point. The water was then removed while stirring under vacuum and N,N-dimethylacetamide was added from time to time so as to maintain the same volume of material in the vessel. Once all of the water had been removed, 4.5 g LiCl was added to the vessel.

The conversion of the starch to a reactive form was tested by adding 300 gms of stearoyl chloride and 100 ml of pyridine as a catalyst to the vessel. The mixture was allowed to react for 20 minutes and then poured into 3.5 l of water at room temperature. The material which separated was filtered, dried and then redissolved in 3 l of chloroform and precipitated from the chloroform by pouring into 6 l methanol. Filtration and drying gave 250 g of a waxy substance equivalent to a degree of substitution of 2.2.

EXAMPLE 2

40 g (equivalent to 36 g dry) of high amylose starch sold under the trade name Hylon VII was converted to a reactive form in the same manner as Example 1 except that the amount of LiCl used was 3 g. The reactivity of the material was tested by reaction with 128 g decanoyl chloride in the presence of 80 ml of pyridine. The reaction and separation were carried out in the same manner as Example 1. 132 g of a waxy substance was obtained to a decree of substitution of 2.8.

EXAMPLE 3

60 g (equivalent to 54 g dry) of the same starch as used in Example 2 was converted to a reactive form in the same manner as Example 1 except that the amount of lithium chloride used was 6 g. The reactivity of the material was tested by reaction with 300 g of stearoyl chloride in the presence of 100 ml of pyridine. The reaction and separation were carried out in the same manner as Example 1. 270 g of a waxy substance was obtained equivalent to a degree of substitution of 2.4.

EXAMPLE 4

Powdered starch (60 g, giving 54 g dry weight) was added to 1 l water and swollen by boiling at 100° C. for 25–30 minutes with vigorous stirring. DMAc (500 ml) was added and the mixture was distilled under vacuum so that water was preferentially removed. DMAc was added from time to time so as to maintain a minimum volume of material (1 l). Once all the water had been replaced with DMAc, LiBr (25 g) was dissolved in the mixture at 80° C. with a slight exotherm (+5° C.) and an increased transparency was observed. Both these effects are an indication that the starch has been converted to a reactive form.

Pyridine (100) was added while maintaining the temperature at 80° C. Stearoyl chloride (300 g) was added while maintaining the same temperature for 20 minutes. During this time the reaction product separated from the reaction mixture. The product was drained free of liquid. Hot toluene (about 1 l) was poured onto the product and heating continued until the product was dissolved in the toluene. At this point the solution was poured hot into acetone (4 l). After cooling to ambient temperature, the stearoylated starch product was filtered off, washed with acetone and dried under atmospheric conditions to give 300 g of material with a degree of substitution of nearly 2.9.

EXAMPLE 5

30 g (equivalent to 27.6 g dry) of amylopectin was converted to a reactive form in the same manner as Example 1 except that the amount of LiCl used was 1 g. The reactivity of the material was tested by reaction with 155 g stearoyl chloride in the presence of 45 ml of pyridine. The reaction and separation were carried out in the same manner as example 1. 132 g of a waxy substance was obtained equivalent to a degree of substitution of 2.3.

EXAMPLE 6

30 g (equivalent to 25.5 g dry) of amylose was coverted to a reactive form in the same manner as Example 1 except that the amount of LiCl used was 2 g. The reactivity of the material was tested by reaction with 145 g stearoyl chloride in the presence of 45 mL of pyridine. The reaction was separated were carried out in the same manner as example 1. 126 g of a waxy substance was obtained equivalent to a degree of substitution of 2.4.

EXAMPLE 7

Cotton linters (25 g, equivalent to 21.8 g dry) were soaked overnight in water (1 l). After this period the fibres were further separated by agitation in a mixer equipped with a "propeller" type stirrer. The mixture was heated to 100° C., with moderate stirring, and kept at that temperature for 30 minutes. DMAc (500 ml) was added and the mixture was distilled under vacuum so that water was preferentially removed. DMAc was added from time to time so as to maintain a minimum amount of material (1 l). Once all the water had been removed, the temperature was lowered to 80° C. and 2.5 g of lithium chloride was added to the vessel. A decrease in viscosity together with an exotherm indicated that dissolution had taken place although not all the cotton fibres had dissolved.

The conversion of the cotton to a reactive form was tested by adding 120 g of stearoyl chloride and 35 ml pyridine. As the stearoylated cotton product separated from the reaction mixture, the undissolved cotton fibres dissolved and were also converted to a reactive form indicated by more stearoylated cotton separating from the reaction mixture. Reaction was continued for a further 15 minutes and then poured into 2.5 l of water at room temperature. The waxy material which separated was filtered, dried and then redissolved in 2 L of chloroform and precipitated from the chloroform by pouring into 4 L methanol. Filtration and drying gave 100 g of a substance equivalent to a degree of substitution of 2.2.

What is claimed is:

1. A method for making a chemically reactive polysaccharide not containing carboxyl moieties in anhydrous medium comprising the steps of:
   (1) forming a swollen form of the polysaccharide by heating the polysaccharide in the presence of water;
   (2) forming a solvent/polysaccharide/water mixture by adding a solvent to the swollen polysaccharide in water, the solvent being one which has a moiety with the structure

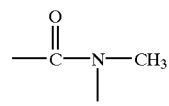

(3) forming an anhydrous solvent/polysaccharide mixture by heating the solvent/polysaccharide/water mixture to remove water while adding further amounts of solvent to maintain a volume of liquid such that the polysaccharide does not settle out and to ensure that all the water is removed; and (4) dissolving at least 1% by weight of a lithium halide selected from the group consisting of lithium chloride and lithium bromide and mixtures thereof in the anhydrous solvent/polysaccharide mixture.

2. A method as claimed in claim 1 wherein, in step (1), the concentration of polysaccharide is in the range of 1 to 15% by weight.

3. A method as claimed in claim 2 wherein said concentration is in the range of 5 to 10% by weight.

4. A method as claimed in claim 1 wherein the polysaccharide is starch.

5. a method as claimed in claim 1 wherein the polysaccharide is cellulose.

6. A method as claimed in claim 1 wherein the polysaccharide is chitin.

7. A method as claimed in claim 1 wherein the solvent N,N-dimethyl acetymide, N,N-dimethyl formamide or N-methyl pyrrolidinone.

8. A method as claimed in claim 1 wherein a single solvent having the moiety

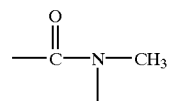

is used.

9. A method as claimed in claim 1 wherein the amount of lithium halide employed in step (4) is in the range 1 to 15% by weight.

10. A method as claimed in claim 9 wherein the amount of lithium halide employed in step (4) is in the range 2 to 12% by weight.

11. A method of forming a polysaccharide derivative comprising esterifying the reactive form of the polysaccharide obtained from step (4) of the method of claim 1.

12. A method as claimed in claim 11 wherein the reactive form of the polysaccharide is esterified with a compound having a carbon chain of at least 6 carbon atoms.

13. A method as claimed in claim 12 wherein said carbon chain comprises 10 to 24 carbon atoms.

\* \* \* \* \*